Aug. 7, 1923.

T. L. FAWICK

FRICTION CLUTCH

Filed July 14, 1921

1,464,173

Inventor:
Thomas L. Fawick
By: [signature] Atty's

Patented Aug. 7, 1923.

1,464,173

UNITED STATES PATENT OFFICE.

THOMAS L. FAWICK, OF RACINE, WISCONSIN, ASSIGNOR TO TWIN DISC CLUTCH COMPANY, OF RACINE, WISCONSIN, A CORPORATION OF WISCONSIN.

FRICTION CLUTCH.

Application filed July 14, 1921. Serial No. 484,659.

*To all whom it may concern:*

Be it known that I, THOMAS L. FAWICK, a citizen of the United States, residing at Racine, county of Racine, and State of Wisconsin, have invented certain new and useful Improvements in Friction Clutches, of which the following is a specification.

My invention relates more particularly to that class of friction clutches in which the driving and driven elements are normally held in engagement by spring pressure and released from engagement at the will of the operator through suitable mechanical means. It is the object of my invention to provide such a clutch which is easily operated and when thrown to the open or disengaged position will remain therein indefinitely until again manipulated and will likewise remain indefinitely in the closed or engaging position when moved thereto until again manipulated to the opposite position. My invention provides a simple and durable clutch which may be easily manufactured and readily manipulated with minimum effort.

Figure 1:
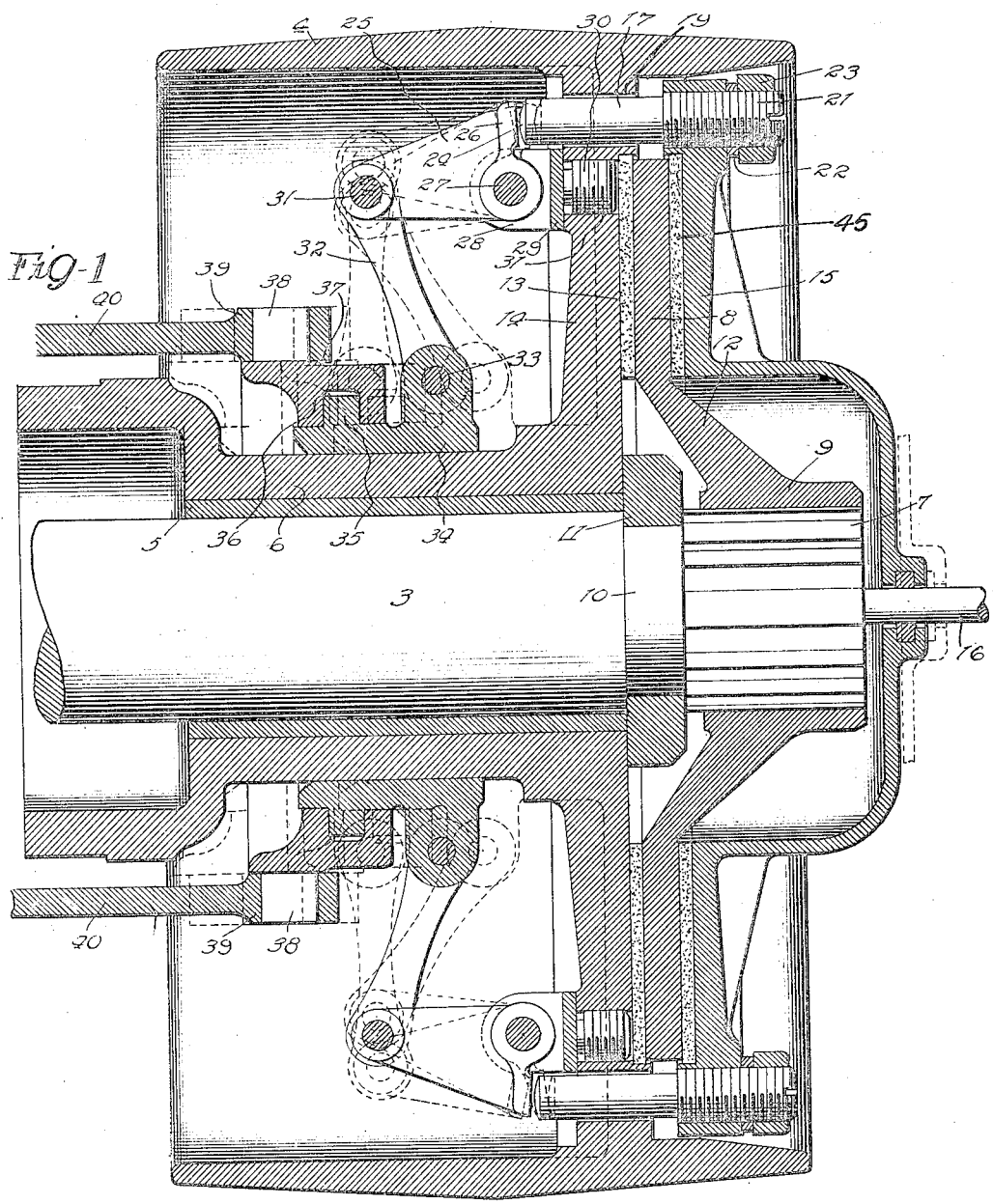
Figure 2:
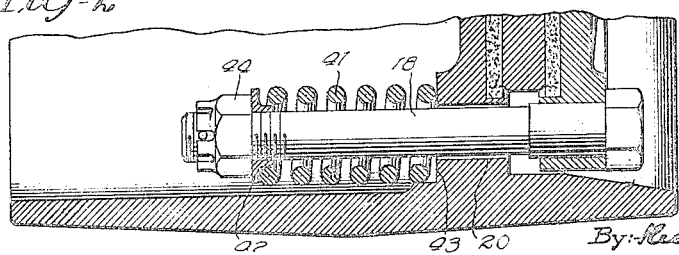

In the drawing Fig. 1 is a central axial section through a clutch embodying my invention, parts being shown in elevation; and Fig. 2 a fragmentary view in section on a different axial plane.

In the particular embodiment of my invention chosen for exemplification thereof and shown in the drawing a driving shaft is shown at 3 and a pulley at 4 revolubly mounted on the driving shaft to permit of relative rotation between these parts. A bushing 5 is shown in the hollow hub or sleeve 6 of the pulley and between the latter and the shaft 3. Shaft 3 is formed with a slightly reduced splined end 7 upon which is mounted a friction disk 8 the interior of the hub 9 of which is splined to engage the splined end 7 of shaft 3. Between the body of shaft 3 and the spline portion 7 thereof is a slightly reduced neck 10 which receives a collar 11 which prevents the movement of the pulley relative to the shaft in one direction, to-wit toward the right as shown in Fig. 1 of the drawing. The flat annular portion 8 of the friction disk is connected to the splined hub 9 by a frusto conical portion 12 whereby the friction disk clears the collar 11.

The flat flange of the friction disk is gripped between the flat surface 13 of the web 14 of the pulley which web thus constitutes one of the clamping elements, and an axially movable clamping element 15.

As heretofore stated the clamping element 15 has a slight axial reciprocation relative to the pulley, but it turns with the latter the two clamping elements being held against relative rotation by bolts 17, 18 which are secured to the axially movable element 15 at points suitably spaced above its periphery and project through openings 19, 20 in the web of the pulley. The bolts 17 constitute a part of the means for forcing the clamping members apart as will presently appear, and are adjustable with reference to the axially movable clamping member 15 but preferably threaded or tapped into the latter as at 21 and provided with washers 22 and nuts 23 to lock said bolts in adjusted position. The number of such bolts may be as desired, and in the drawing I have shown but two of them arranged at diametrically opposite points in the clamping member 15. As heretofore stated the ends of said bolts project through openings in the web of the pulley and are rounded on the projecting ends.

In order to bring the required pressure to bear upon the bolts 17 to operate the clamping member I mount adjacent the rounded ends 24 of the respective bolts bell crank levers 25 the shorter arms 26 of which are formed with seats which bear upon the rounded ends of the bolts. Said levers are preferably adjustably mounted upon the web of the pulley. For this purpose each lever is journaled on a pivot 27 extending between the lugs 28 of a bracket 29 which is formed or provided with a threaded stud 30 tapped into an opening 31 in the web of the pulley. Obviously the position of the bell crank may be adjusted by the construction shown but preferably and ordinarily the bracket 29 is screwed in so that it rests firmly against the contiguous face of the web of the pulley. The longer arm of the bell crank lever extends outwardly in a direction approximately parallel to the axis of the clutch a distance depending upon, inter alia, the power to be applied to operating the clutch. The long arm of each lever is pivoted at 31 to a link 32 the other end of which is pivoted at 33 to a longitudinally movable sleeve 34 sliding upon the hub or sleeve of the pulley. The sleeve 34 is formed or provided with an annular circumferential rib or flange 35 which extends within an annular inner recess or groove 36 in an axially movable collar 37, the construction being such that the collar 37 and sleeve must reciprocate or move axially together but are free to move angularly or rotate with respect to each other. The collar 37 is preferably provided with studs 38 on opposite sides thereof which are respectively engaged by eyes 39 on links 40 by which said collar and consequently said sleeve are moved.

As heretofore stated the clamping members of the clutch are normally pressed towards each other and against the intermediate friction disk by springs 41, these springs surrounding the bolts 18, secured to the axially movable clamping member and compressed between adjustable collars 42 on bolts 18 and seats 43 formed on the web of the pulley. The collars 42 are held from displacement by means of lock nuts 44 on the ends of bolts 18. The bolts and springs may be employed in any number desired but it is advisable that they as well as the manually operated means for forcing the clamping members apart be arranged as nearly symmetrically as practicable.

It will be obvious from the drawing and the foregoing description that when the sleeve 34, links and levers are in the inner or right hand position shown in dotted lines in the drawing the springs force the clamping members toward each other and toward the intermediate friction disk and the friction facings 45 under the pressure of the springs compel the intermediate friction disk and the adjacent clamping members to travel together. When the sleeve 34 is moved to the left, as shown in the drawing it swings the levers about the pivots through the links and causes said levers to engage the ends of the respective bolts 17 and force said bolts and the axially movable clamping member to the right, as shown in the drawings, and thereby the pressure is relieved upon the friction disk 8 so that the latter and the shaft on which it is splined are free to rotate without or independently of the pulley. The friction disk adjusts itself slightly on the shaft with reference to which it is axially movable when the pressure is relieved. The proportioning and arrangement of the levers and links are such that the sleeve 34 may be carried to the left slightly beyond the point at which the levers are perpendicular to the axis of the clutch and when the sleeve is moved to this position the pressure of the springs acting on the axially movable clamping member, the bell crank levers and the links tends to and does hold the parts in this position with the friction elements out of engagement or in other words with the clutch in the open position until pressure is again applied to force the ring past the dead center position when the springs through the axially movable clamping member, levers and links force the shifting ring to the right where it no longer prevents the engagement of the clutch members.

It will be noted that the cylindrical portion of the hub on which the sleeve 34 travels is of such length that when the thickness of the friction members 45 is considerably reduced by use the clutch will be operative without adjustment, the only effect of the reduction in thickness being that when the clutch is in engagement the sleeve 34 will be somewhat further to the right. When adjustment is necessary it may be accomplished by means of the bolts 17 and nuts 23.

I claim:

1. In a friction clutch a friction disk, clamping members axially movable with respect to each other engaging said disk on opposite sides thereof, spring means for holding the parts in engaged position, levers for moving the clamping members apart in opposition to said springs, an axially movable element and links engaging said element and the levers the construction and arrangement being such that the links are movable past a dead center position whereby the clutch is yieldingly held at will either in open or closed position.

2. In a device of the class described a shaft, a friction disk on the shaft, a rotary element journaled on the shaft and having two clamping members one of which is axially movable toward the friction disk, spring means for pressing the clamping elements towards each other and towards the friction disk, bolts connected to one of the clamping elements and extending through the other, bell crank levers pivoted to the latter clamping element and arranged to engage the respective bolts, a collar mounted to revolve with said clamping members but axially movable with respect thereto, means for reciprocating said collar, links connecting the collar and the respective levers and movable past a dead center with respect thereto whereby said clutch is yieldingly held in either the open or the closed position.

THOMAS L. FAWICK.